United States Patent [19]

Dealy et al.

[11] Patent Number: 4,883,622
[45] Date of Patent: Nov. 28, 1989

[54] METHOD OF MANUFACTURING DISCRETE FIBER REINFORCED, PLASTIC TUBE AND APPARATUS THEREFOR

[75] Inventors: John M. Dealy, Westmount; Jean-Michael Charrier, Ile des Soeurs; Shailesh Doshi, Montreal, all of Canada

[73] Assignee: Canadian Patents and Development Limited, Ottawa, Canada

[21] Appl. No.: 97,723

[22] Filed: Sep. 17, 1987

[51] Int. Cl.[4] .............................................. B29C 47/24
[52] U.S. Cl. ................................... 264/108; 264/173; 264/174; 425/114; 425/133.1; 425/382.3
[58] Field of Search .................... 264/173, 174, 108; 425/133.1, 114

[56] References Cited

U.S. PATENT DOCUMENTS

| | | | |
|---|---|---|---|
| 2,973,783 | 3/1961 | Boe | 425/114 |
| 3,289,251 | 12/1966 | Daubenfeld | 425/114 |
| 3,404,203 | 10/1968 | Donald | 264/108 |
| 3,534,437 | 10/1970 | Quackenbush | 425/114 |
| 3,576,707 | 4/1971 | Schrenk | 264/171 |
| 3,697,209 | 10/1972 | Schiesser | 425/133.1 |
| 3,856,447 | 12/1974 | Schiesser | 425/133.1 |
| 3,856,448 | 12/1974 | Iijima et al. | 425/462 |
| 3,862,868 | 1/1975 | Spillers | 264/173 |
| 3,933,960 | 1/1976 | Cameron et al. | 264/108 |
| 4,056,591 | 11/1977 | Goettler et al. | 264/108 |

*Primary Examiner*—Jeffery Thurlow
*Attorney, Agent, or Firm*—Ronald G. Bitner

[57] ABSTRACT

A method and apparatus for making multi-layered plastic tube reinforced with fibers by a co-extrusion process. The method and apparatus provide more specifically a multi-layered plastic tube with an intermediate layer thereof having discrete fibers where at least a major portion of the fibers is oriented to extend predominantly in a general direction lying between the circumferential and the longitudinal axis of the tube with the orientation of the fibers being generally the same throughout the thickness of the intermediate layer. In one embodiment, the method comprises (a) introducing a first plastic material in an upstream portion of an annular die channel; (b) introducing a second plastic material filled with fibers in the upstream portion and around the whole of the first material; (c) introducing a third plastic material in the upstream portion and around the whole of the second material; and co-extruding the materials through a downstream portion of the annular die channel which is divergent diametrically in the downstream direction.

6 Claims, 2 Drawing Sheets

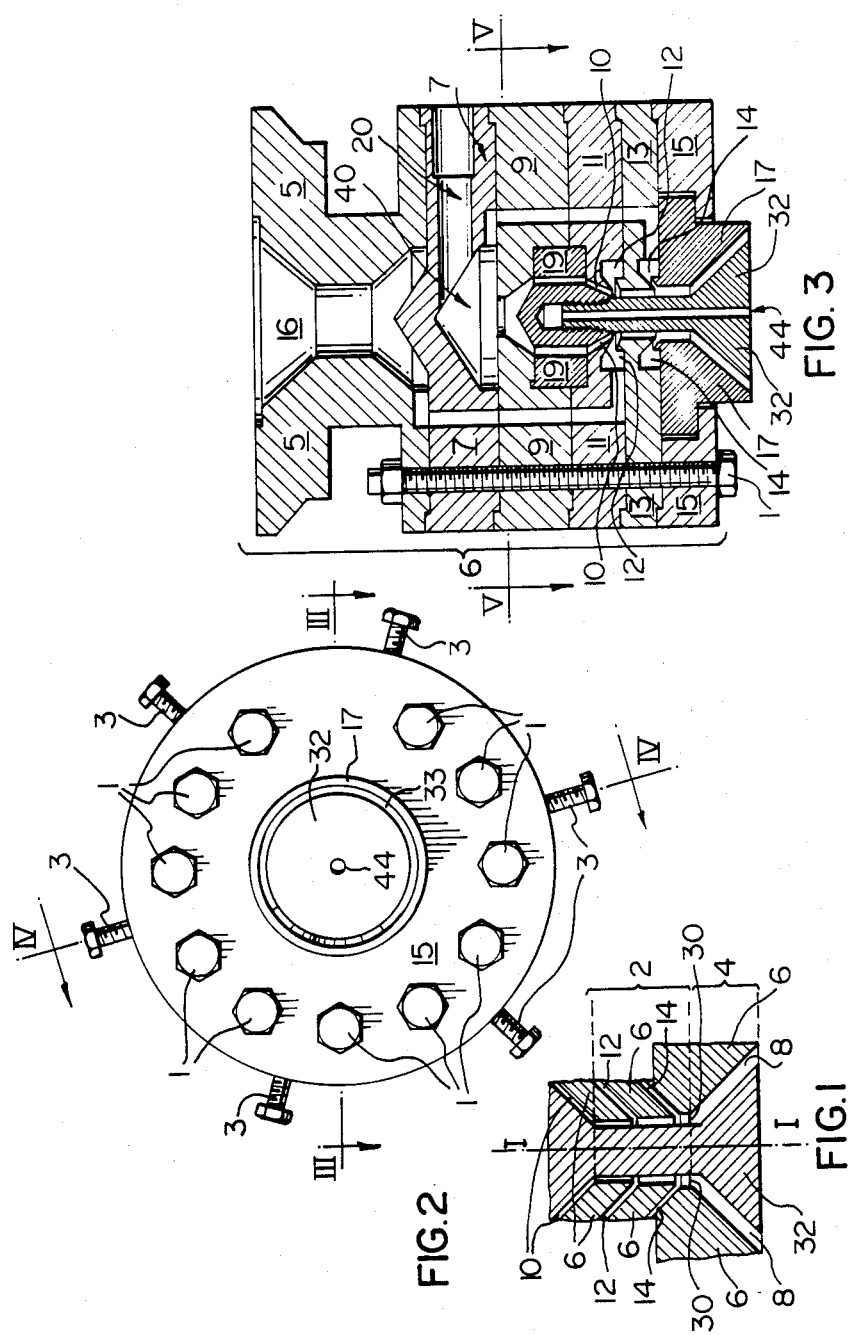

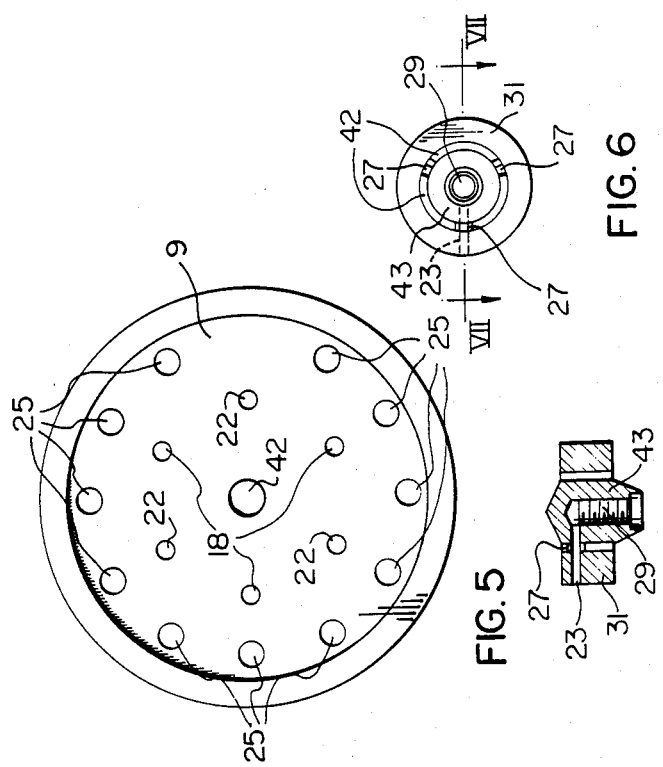
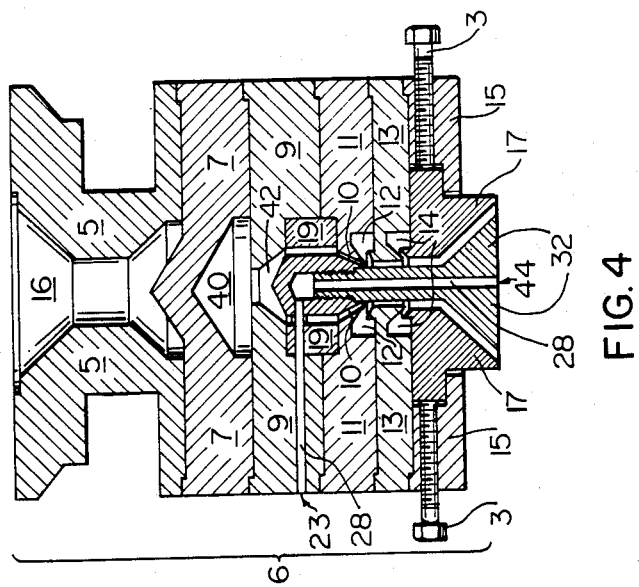

METHOD OF MANUFACTURING DISCRETE FIBER REINFORCED, PLASTIC TUBE AND APPARATUS THEREFOR

FIELD OF THE INVENTION

This invention relates to a method of manufacturing discrete fiber reinforced, plastic tube and apparatus therefor.

More particularly the present invention relates to a method and an apparatus for making plastic tube by a co-extrusion process.

BACKGROUND ART

It is known that the mechanical properties of plastic pipe can be improved by incorporation of discontinuous reinforcing fibers in it. It is also known that properties of the fiber reinforced plastic tube are strongly dependent on fiber orientation. A significant improvement in certain properties of fiber reinforced plastic tube occurs in the direction of preferential fiber orientation.

There have been a number of methods and apparatus proposed for making plastic tubes. Known in the art is a process for controlling orientation of discontinuous fiber in fiber reinforced tube formed by extrusion (U.S. Pat. No. 4,056,591, November 1, 1977 Goettler). The process described in this patent comprises extruding a mixture of fibers and matrix material through a diverging channel of essentially constant width formed by stationary die members. The outlet area of the die channel being at least two or more times the channel inlet areas, this relation between outlet and inlet area provides plastic tube having improved physical properties in the hoop direction.

Another known method of extruding fiber reinforced plastic tube (U.S. Pat. No. 3,933,960 January 20, 1976 Cameron et al) comprises continuously extruding at least one viscous material having reinforced fibers therein through two concentric sets of converging discrete passages, producing laminar flow in the passages by causing the material to accelerate on entry into the passages and preventing deceleration thereof within the passages whereby the fibers orientate themselves in the material in a lengthwise direction of the passages, and then bringing together the extruded material from the respective passages so as to form two layers of material one within the other with the fibers of each layer lying on helices of opposite hands with respect to one another by passage through rotating die members.

Although all the above processes are suitable for providing plastic tubes with reinforced fibers, none of these processes can produce in a satisfactory manner multi-layered plastic tubes having an intermediate layer containing discrete fibers where a major portion of the fibers is oriented to extend predominantly in a general direction lying between the circumferential and the longitudinal axis of the tube with the orientation of the fibers being generally the same throughout the thickness of the intermediate layer. Theoretical and experimental research have shown that while a die similar to the one taught by Goettler can give rise to a preferential circumferential orientation of the fibers in a certain region of material, a significant longitudinal orientation is unavoidable in regions near the walls of the die. The reason is that the flow through such a die involves a superposition of shear and extensional components of deformation. While the shear component tends to orient the fibers in the longitudinal direction, the extensional component tends to orient them in the circumferential direction. The magnitude of the extensional component becomes insignificant near the wall of the die as the shear component approaches a maximum, therefore the fibers tend to a longitudinal orientation near the inner and outer walls of the die. This method does not provide fibers having the same orientation throughout the thickness of the tube. The process described by Cameron et al provides a multi-layered tube with helically oriented fibers. The rotating die members taught by Cameron et al limits the process to providing reinforced fibers with helical orientation as distinct from circumferential and longitudinal orientation.

There is a need for a method of, and an apparatus for, making discrete fiber reinforced plastic tube having an improved overall fracture toughness.

There is also a need for a method of, and an apparatus for, making discrete fiber reinforced plastic tube having an improved stiffness and strength.

There is also a need for a method of, and an apparatus for, making discrete fiber reinforced plastic tube having an intermediate layer of plastic material containing discrete fibers, where a major portion of the fibers is oriented to extend predominantly in a general direction lying between the circumferential and the longitudinal axis of the tube with the orientation of the fibers being generally the same throughout the thickness of the intermediate layer, by a simple and continuous process.

SUMMARY OF THE INVENTION

According to the present invention there is provided a method of extruding discrete fiber reinforced, plastic tube, comprising:

(a) introducing a first plastic material in an upstream portion of an annular die channel for forming an inner layer of the tube;

(b) introducing a second plastic material filled with discrete fibers in the upstream portion of the channel and around the whole of the inner layer for forming an intermediate layer of the tube;

(c) introducing a third plastic material in the upstream portion of the channel around the whole of the intermediate layer for forming an outer layer of the tube; and (d) co-extruding the materials through a downstream portion of the annular die channel which is divergent diametrically in a downstream direction so that at least a major portion of the fibers are oriented to extend predominantly in a generally direction lying between the circumferential and longitudinal axis of the tube with the orientation of the fibers being generally the same throughout the thickness of the intermediate layer.

In some embodiments of the present invention the plastic materials are thermoplastic materials.

In other embodiments of the present invention the discrete fibers are of at least one material selected from the group consisting of glass, high strength polymer, mineral, carbon and metal.

Further, according to the present invention there is provided a discrete fiber reinforced, plastic tube extruding apparatus comprising a casing assembly having a cavity and mandrel secured coaxially within the cavity of the casing assembly, the cavity and the mandrel forming an annular die channel, the annular die channel having an upstream portion and downstream portion; the upstream portion having a first inlet means for introducing a first plastic material in the channel and forming an inner layer of the tube therefrom adjacent to the mandrel, a second inlet means for introducing a second plastic material filled with discrete fibers in the channel and around the whole of the inner layer to form an intermediate layer of the tube and a third inlet means for introducing a third plastic material in the channel and around the whole of the intermediate layer to form an outer layer of the tube therefrom adjacent to the casing assembly; and the downstream portion of the annular die channel diverging diametrically in a downstream direction so that, when the materials are extruded through the downstream portion for forming the plastic tube, at least a major portion of the fibers is oriented to extend predominantly in a general direction lying between the circumferential and the longitudinal axis of the tube with the orientation of the fibers being generally the same throughout the thickness of the intermediate layer.

BRIEF DESCRIPTION OF THE DRAWINGS

In the accompanying drawings which illustrates, by way of example, embodiments of the present invention, FIG. 1 is a sectional plan view of a portion of a discrete fiber reinforced, plastic tube producing apparatus, the side view having been cut along a plane passing through the central longitudinal axis of the apparatus;

FIG. 2 is a front view of another embodiment of a discrete fiber reinforced plastic tube producing apparatus;

FIG. 3 is a sectional plan view along the line III—III, FIG. 2;

FIG. 4 is a sectional plan view along the line IV—IV, FIG. 2;

FIG. 5 is an end view along line V—V, FIG. 3 of an intermediate casing member;

FIG. 6 is a front view of a spider construction of the apparatus shown in FIGS. 2, 3, 4, and 5; and FIG. 7 is a sectional plane view along the line VII—VII, FIG. 6.

DETAILED DESCRIPTION OF THE DRAWINGS

In FIG. 1, there is shown a sectional plan view of a portion of a discrete fiber reinforced, plastic tube extruding apparatus. The apparatus shown comprises a casing assembly 6 (partially shown) having an annular die channel 8, the annular die channel 8 having an upstream portion 2 and a downstream portion 4; the upstream portion 2 having a first inlet means 10 by which a first plastic material, when in operation, is introduced in the channel 8 for forming an inner layer of a tube, a second inlet means 12 by which a second plastic material filled with discrete fibers, when in operation, is introduced in channel 8 and around the whole of the inner layer for forming an intermediate layer of the tube and a third inlet means 14 by which a third plastic material, when in operation, is introduced in the channel 8 and around the whole of the intermediate layer for forming an outer layer of the tube; and the downstream portion 4 of the annular die channel 8 diverging diametrically in the downstream direction so that, when the materials are extruded through the downstream portion for forming the plastic tube, at least a major portion of the fibers is oriented to extend predominantly in a general direction lying between the circumferential and longitudinal axis of the tube with the orientation of the fibers being generally the same throughout the thickness of the intermediate layer.

The portion of casing assembly 6 forming the downstream portion 4 of the annular die channel 8 also comprises coextruding inlet means 30 by which plastic materials are injected in the downstream portion 4, an inner mandrel 32 tapering outwardly in the downstream direction and forming an inner boundary surface of the annular channel 8, and an outer member 17 with a cavity tapering outwardly in the downstream direction and forming an outer boundary surface of the annular channel 8 so that the downstream 4 portion of the channel 8 diverges diametrically in the downstream direction.

In operation, the apparatus shown in FIG. 1 extrudes discrete fiber reinforced, plastic tube by:

(a) introducing a first plastic material in the upstream portion 2 of the annular die channel 8 for forming the inner layer of the tube;

(b) introducing a second plastic material filled with discrete fibers in the upstream portion 2 of the channel 8 and around the whole of the inner layer for forming the intermediate layer of the tube;

(c) introducing a third plastic material in the upstream portion 2 of the channel 8 and around the whole of the intermediate layer for forming the outer layer of the tube;

(d) co-extruding the materials through the downstream portion 4 of the annular die channel 8 which is divergent diametrically in the downstream direction so that at least a major portion of the fibers is oriented to extend predominantly in a generally direction lying in between the circumferential and longitudinal axis of the tube with the orientation of the fibers being generally the same throughout the thickness of the intermediate layer.

The presence of the inner and outer layer on the inside and outside of the intermediate layer during co-extrusion through the downstream portion 4 of the channel 8 reduces the effect of the shear components of deformation, which occur near the inner and outer boundary surfaces of the channel 8, on the intermediate layer so that the orientation of the fibers is substantially the same throughout the thickness of the intermediate layer.

The orientation of the fibers depends on the rheological properties of the plastic materials used for the inner, outer and intermediate layers of the tube and on the length and angle of divergence of the downstream portion 4 of the channel 8. Larger differences in viscosities of the materials, diverging angle and length of the downstream portion 4 will provide a greater extent of circumferential orientation, up to a limit.

In FIGS. 2 to 7 there is shown another discrete fiber reinforced, plastic tube extruding apparatus.

FIG. 2 shows the front end of the apparatus where the exit opening 33 of an annular channel is formed between a mandrel 32 and an outer hollow member 17. Also shown is an exhaust opening 44 of an air channel. The casing assembly 6 is made of six casing member (only a front casing member 15 is shown in FIG. 2) held together by eleven mechanical fasteners 1. Six centering screws 3 allow the centering of the outer hollow member 17 with respect to the mandrel 32 for adjusting the width of the annular channel 8 in its downstream portion.

In FIG. 3 there is shown a sectional plan view of the apparatus along line III—III of FIG. 2 and in FIG. 4 there is shown a sectional plan view of the apparatus along line IV—IV of FIG. 2. Referring to FIGS. 3 and 4 the apparatus comprises six casing members which are the front end casing member 15, a back end casing member 5 and four intermediate casing members 7, 9, 11 and 13. All the casing members are held together by eleven mechanical fasteners 1 (one of which is shown in FIG. 3). A first feed channel 16 can supply plastic material containing discrete fibers to a second inlet means 12 via three channels 18 (one of which is shown in FIG. 3) parallel to the longitudinal axis of the channel 8. The second inlet means 12 comprises a first annular hollow ring portion, deliminated by two intermediate casing members 11 and 13, for receiving the plastic material containing fibers from the three channels 18. A second feed channel 20 can supply plastic materials to a first inlet means 10 and a third inlet means 14 of the annular channel 8 via a divider 40. The plastic material is conveyed from the divider to the first inlet means 10 via a central channel 42 and to the third inlet means 14 via three channels 22 (one of which is shown in FIG. 3) parallel to the longitudinal axis of the annular channel 8. The third inlet means 14 comprises an annular hollow ring portion, deliminated by one intermediate casing member 13 and the outer hollow member 17, for receiving the plastic material from the three channels 22 extending from the divider 40. A spider construction 19, which is shown with more details in FIGS. 6 and 7, is used for holding the mandrel 32 with respect to the outer hollow member 17. The spider construction 19 has a threaded cavity into which a threaded portion of the mandrel 32 can be screwed. The central channel 42 extends through the spider construction 19 up to the first inlet means 10.

The annular channel 8 has an upstream portion 2 and a downstream portion 4. The upstream portion 2 of the annular die channel 8 is delimitated by an outer boundary surface, formed by two intermediate casing member 11, 13 and a portion of the outer hollow member 17, and an inner boundary surface formed by the mandrel 32. The downstream portion 4 is delimitated by an outer boundary surface formed by the outer hollow member 17 and an inner boundary surface formed by the mandrel 32. The upstream portion 2 has a constant diameter and the downstream portion 4 diverges diametrically in the downstream direction. The width of the channel in the downstream portion can be adjusted by six centering screws 3 (two of which are shown in FIG. 4). The air channel 28 has an air inlet means 23 by which pressurized air can be injected into the air channel 28. The air channel 28 extends from the inlet means 23 perpendicularly to the longitudinal axis of the annular channel 8 up to the threaded portion of the mandrel, from there it extends along the longitudinal axis of the annular die channel 3 and inside the mandrel 32 up to the exhaust opening 44.

Pressurized air can be fed into the tube as it is being extruded from the exhaust opening 44 for controlling the size of the tube.

In FIG. 5 there is shown an end view of intermediate casing member 9 showing the distribution of the channels 18, 22 and 42 and fastener holes 25.

The mechanical fasteners 1 of FIG. 2 hold the front end casing member 15, the back end casing member 5 and the four intermediate casing members 7, 9, 11, 13 by means of the holes 25.

A first plastic material containing discrete fibers is brought to the annular die channel 8 by means of the three channels indicated as 18.

A second plastic material is brought to the annular die channel 8 by means of the central channel 42 and the three channels indicated as 22.

In FIG. 6 there is shown a front view of the spider construction 19 of the apparatus shown in FIGS. 3 and 4. The spider construction has an outer ring member 31 and a hub portion 43. The outer ring member 31 supports the hub portion 43 by means of three legs 27. Arcuate channels 42 carry the plastic material (not shown) to the first inlet means 10 and extend between the three legs 27 and are bounded by the outer ring member 31 and the hub portion 43. The hub portion 43 has a threaded cavity 29 into which the threaded portion of the mandrel is screwed.

In FIG. 7 there is shown a sectional plan view of the spider construction of FIG. 6 along the line VII—VII. The outer ring member 31 supports the hub portion 43 by means of three legs 27 (one of which is shown in this drawing and through which air inlet means 23 extends).

The central channel 42 is delimitated by the outer ring member 31 and the hub portion 43. The air channel 28 that carries pressurized air extends throughout the outer ring member 21, one of the legs 27 and the hub portion 43 up to the threaded cavity 29.

While the embodiment of the present invention shown in FIGS. 2 to 7 shows a discrete fiber reinforced, plastic tube apparatus for producing a three layer tube, it will be appreciated that it is within the scope of the present invention to provide at least one more additional layer on the inside or the outside of the three layers, or at least one additional layer on both sides of the three layers.

Thus the inner and outer plastic layers produced by the apparatus need not be the inner and outer most layers of the tube.

While in the embodiment of the present invention shown in Figures 2, 3 and 4, the end of the downstream portion of the annular die channel 8 forms an exit for the co-extruded materials, it will be appreciated that it is within the scope of the present invention to provide a straight annular channel section downstream to the downstream portion 4 of the annular die channel 8, for example, to improve the surface finish. If the straight channel section is not too long, the inner and outer layers will continue to reduce the effect of shear components on fiber orientation in the intermediate layer during the flow through the straight channel section and thus prevent major change in fiber orientation developed in the downstream portion 4 of the annular die channel 8.

While in the embodiment of the present invention shown in Figures 3 and 4, the first feed channel 20 supplies plastic material to both the inner and outer layers of the tube, it will be appreciated that it is within the scope of the present invention to provide two separate feed channels for providing independently plastic materials to the first inlet means 10 and the third inlet means 14 whereby different plastic materials may be used for the inner and outer layers of the tube.

EXPERIMENTAL RESULTS

An apparatus similiar to the one shown in FIGS. 2 to 7 was experimented. The apparatus in question is further defined by an annular die channel 8 having a uniform width, between the mandrel 32 and the outer hollow member 17, of about 3 mm and an angle of divergence with respect to the longitudinal axis of the channel 8 of about 50°. Diameter expansion of the downstream portion 4 is about 2.6, which is the ratio of the diameter at the end of the downstream portion 4 to that of the upstream portion 12.

A first extruder is used to supply plastic materials containing discrete fibers, the screw having a diameter of about 63 mm and a screw length to diameter ratio of 30. The barrel temperature of the first extruder is 190°–205° and its feed rate is 9.5 cm$^3$/s. A second extruder is used to supply plastic materials for the inner and outer layers, it has a screw diameter of 32 mm and a screw length to diameter ratio of 24. The barrel temperature of the second extruder is 170°–200° and its feed rate is 3.1 cm$^3$/s. The extrudate tube emerging from the downstream portion 4 of the annular die channel 8 is cooled in a cooling tank, having a desired length, flooded with water and maintained under vacuum.

A three layer coextruded tube with a nominal diameter of 50 mm and a nominal thickness of 1.6 mm was produced with the apparatus described above. The inner and outer layers of the tube are made of polyethylene resin and the middle layer is made of composite material comprising polyethylene resin together with 30% (by weight) short glass fibers as reinforcement.

In order to determine the fiber orientation pattern in the tube, the tensile strength of the tube was measured in longitudinal and circumferential directions of the tube. For this purpose, test pieces were cut from tube samples in two directions (longitudinal and circumferential) and subjected to a tensile test in accordance with standard test method ASTM D 638. The ratio of the tensile strength in the longitudinal direction to that in the circumferential direction provides an indication of the fiber orientation pattern present in the tube. A greater ratio than unity implies a preferential orientation in the longitudinal direction. The larger this ratio is, the greater is the orientation in this direction. A ratio less than one indicates a preferential orientation in the circumferential direction. It is understood that the fibers can be oriented at various angles with respect to the longitudinal and circumferential directions and can contribute to the measured tensile strength in the two directions. A ratio equal to one indicates a balanced fiber orientation with respect to the two directions.

The average value of the tensile strength in the longitudinal direction is 26.4 MPa and in the circumferential direction is 27.7 MPa, therefore the ratio of the tensile strength in longitudinal direction to that is the circumferential direction is 0.95. The data show that the fibers are oriented preferentially in the circumferential direction, the orientation being generally the same throughout the thickness of the intermediate.

We claim:

1. A method of extruding discrete fiber reinforced, plastic tube, comprising:
    (a) introducing a first plastic material in an upstream portion of an annular die channel for forming an inner layer of the tube;
    (b) introducing a second plastic material filled with discrete fibers in the upstream portion of the channel and around the whole of the inner layer for forming an intermediate layer of the tube;
    (c) introducing a third plastic material in the upstream portion of the channel and around the whole of the intermediate layer for forming an outer layer of the tube; and
    (d) co-extruding the materials through a downstream portion of the annular die channel which is divergent diametrically in the downstream direction so that at least a major portion of the fibers are oriented to extend predominantly in a general direction lying between the circumferential and the longitudinal axis of the tube with the orientation of the fibers being generally the same throughout the thickness of the intermediate layer.

2. A method as defined in claim 1 wherein the plastic materials are thermoplastic material.

3. A method as defined in claim 1 wherein the discrete fibers are of at least one material selected from the group consisting of glass, high strength polymer, mineral, carbon and metal.

4. A discrete fiber reinforced, plastic tube extruding apparatus comprising: a casing assembly having an annular die channel, the annular die channel having an upstream portion and a downstream portion; the upstream portion having a first inlet means by which a first plastic material is introduced in the channel for forming an inner layer of the tube, a second inlet means by which a second plastic material filled with discrete fibers is introduced in the channel and around the whole of the inner layer for forming an intermediate layer of the tube and a third inlet means by which a third plastic material is introduced in the channel and around the whole of the intermediate layer for forming an outer layer of the tube; and the downstream portion of the annular die channel diverging diametrically in the downstream direction so that, when the materials are extruded through the downstream portion for forming the plastic tube, at least a major portion of the fibers is oriented to extend predominantly in a general direction lying between the circumferential and the longitudinal axis of the tube with the orientation of the fibers being generally the same throughout the thickness of the intermediate layer.

5. An apparatus as defined in claim 4, wherein the portion of the casing assembly forming the downstream portion of the annular die channel further comprises:
    (a) co-extruding inlet means by which the plastic materials are injected in the downstream portion;
    (b) an inner mandrel tapering outwardly in the downstream direction and forming an inner boundary surface of the annular channel, and
    (c) an outer hollow member with a cavity tapering outwardly in the downstream direction and forming an outer boundary surface of the annular channel whereby the annular die channel diverges diametrically in the downstream direction.

6. An apparatus as defined in claim 5 further comprises a first and a second feed channel, the first feed channel being for conveying plastic material filled with discrete fiber to the second inlet means and the second feed channel being for conveying plastic material to the first and third inlet means.

* * * * *